(12) United States Patent
Osborn et al.

(10) Patent No.: US 6,768,901 B1
(45) Date of Patent: Jul. 27, 2004

(54) DYNAMIC HARDWARE RESOURCE MANAGER FOR SOFTWARE-DEFINED COMMUNICATIONS SYSTEM

(75) Inventors: Gregory Ralph Osborn, Chandler, AZ (US); Lisa Ponzini De Leon, Scottsdale, AZ (US)

(73) Assignee: General Dynamics Decision Systems, Inc., Scottsdale, AZ (US)

( * ) Notice: Subject to any disclaimer, the term of this patent is extended or adjusted under 35 U.S.C. 154(b) by 481 days.

(21) Appl. No.: 09/586,120

(22) Filed: Jun. 2, 2000

(51) Int. Cl.$^7$ .................................................. H04J 3/16
(52) U.S. Cl. .................. 455/230; 455/423; 455/424; 455/452.1
(58) Field of Search .................. 455/63, 423–425, 455/450, 452, 230, 452.2, 63.1, 452.1

(56) References Cited

U.S. PATENT DOCUMENTS

| | | | |
|---|---|---|---|
| 5,230,078 A | | 7/1993 | Varela et al. ............... 455/67.1 |
| 5,479,477 A | * | 12/1995 | McVey et al. ............... 455/508 |
| 5,842,015 A | * | 11/1998 | Cunniff et al. ............... 718/104 |
| 6,295,491 B1 | | 9/2001 | Ayoub et al. ................ 701/33 |
| 6,332,023 B1 | * | 12/2001 | Porter et al. ................ 379/242 |
| 6,333,936 B1 | * | 12/2001 | Johansson .................... 370/449 |
| 6,370,381 B1 | * | 4/2002 | Minnick ...................... 455/455 |
| 6,385,434 B1 | * | 5/2002 | Chuprun et al. ........... 455/11.1 |
| 6,493,354 B1 | * | 12/2002 | Hansquine et al. ......... 370/468 |

* cited by examiner

*Primary Examiner*—William Trost
*Assistant Examiner*—Brandon J Miller
(74) *Attorney, Agent, or Firm*—Jenner & Block LLP

(57) ABSTRACT

A hardware resource manager (18) dynamically allocates hardware resources in a software-defined communications system. The hardware resource manager (18) creates a specification of required hardware resources (300) necessary for executing a system application. The hardware resource manager (18) then creates a list of candidate hardware resources (306) from the plurality of available hardware resources in response to an application creating its own abstract resource specification (78) of required hardware resources. The hardware resource manager (18) then maps each required hardware resource on the specification of required hardware resources to a least functional and most available candidate hardware resource on the list of candidate hardware resources in a manner that maximally preserves most functional and least available candidate hardware resources on the list of candidate hardware resources (316–326).

20 Claims, 10 Drawing Sheets

DYNAMIC HARDWARE RESOURCE MANAGER FOR SOFTWARE-DEFINED COMMUNICATIONS SYSTEM

BACKGROUND OF THE INVENTION

1. Field of the Invention

The present invention relates generally to communications systems, and more particularly to the dynamic allocation of hardware and firmware resources to system applications based on a best fit of an application hardware resource specification to available hardware resources.

2. Description of Related Art

A conventional multiple-channel communications system includes a relatively fixed hardware configuration that supports software applications each having embedded, or hardcoded, knowledge of the hardware configuration. Because the software applications are tied to the underlying hardware configuration, the applications are not readily portable to new hardware configurations and must typically be updated when the hardware configuration is modified. These limitations are amplified in large distributed applications in which application resources may have special proximity and connectivity constraints. As a result, hardware resources are often inefficiently allocated on a first available basis rather than on a best-fit basis.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF THE PREFERRED EMBODIMENTS

Figure 1:
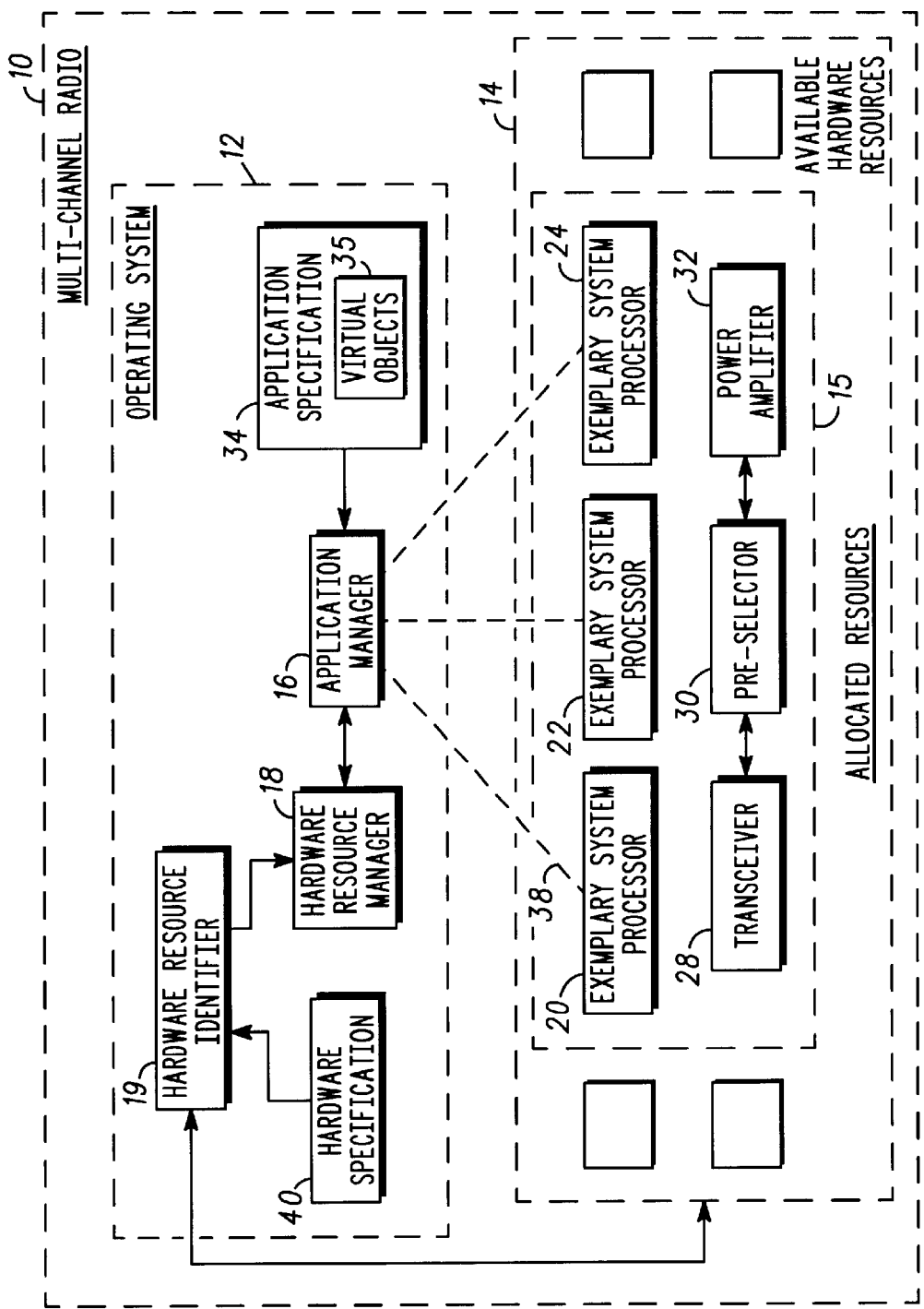
FIG. 1 is a block diagram of the hardware and software components in a software-defined communications system incorporating the hardware resource identifier of the present invention.

Referring now to the drawings in which like numerals represent like parts, FIG. 1 is a block diagram of an exemplary system architecture for a multi-channel radio 10 of the type in which the present invention is implemented. Preferably, the system architecture is that of a wireless information transfer (WITS) radio that is manufactured and sold by Motorola Corporation, the assignee of the present invention, and that includes a system platform, or operating system, 12, available system resources 14 and allocated resources 15 indicated by the darkened resource boxes in the available resources 14. The system platform 12 is part of the infrastructure of the radio 10, and includes an application manager 16 and a hardware resource manager 18, both of which are implemented via pre-loaded operating system software. The hardware resource manager 18 also includes a hardware resource identifier 19 that is responsible for identifying and tracking constraints of and interdependencies among the available hardware resources 14 to enable the hardware resource manager 18 to efficiently designate the allocated resources 15 from the available hardware resources 14 for system applications.

The available hardware resources 14 include resources such as, for example, PPC processors, Sharc processors, FPGAs, DSPs, and the like, as well as other hardware resources required by the radio 10 to execute system applications. The allocated hardware resources 15, represented in FIG. 1 by exemplary system processors 20, 22, 24 as well as a transceiver 28, a pre-selector 30 and a power amplifier 32, are selected from the available hardware resources 14 for use in executing an application.

The application manager 16 is responsible for executing a system application, typically in response to an operator-initiated event, based on a stored application specification 34 that is associated with the application. The application specification 34 contains application object descriptions, known as virtual objects, 35 required hardware resource information and software object-to-processor mapping information that application developers need to guarantee correct operation of system applications, and serves as common language among applications, the application manager 16 and the hardware resource manager 18 for specifying required and available resources during system resource allocation. The application manager 16 retrieves software objects, such as the one shown at 36, required to run the application from an application object library 37 (FIG. 2) based on the virtual objects 35, and loads the objects 36 onto the hardware processors 20, 22, 24 through a mapping function represented generally at 38 based on hardware resource allocation information provided by the hardware resource manager 18 and generated by the hardware resource identifier 19.

The hardware resource manager 18 of the present invention is responsible for allocating hardware resources to system applications so that the least available and most functional of the available hardware resources 14 are not allocated until all options for using more available and/or less functional hardware resources for an application are exhausted. Details as to how the hardware resource manager 18 allocates hardware resources are discussed in detail below. The hardware resource manager 18 allocates hardware resources to an application based on characteristics, or attributes, of available hardware resources such as, for example, resource capabilities, name, type, flavor, shared, version, and address characteristics stored in a hardware specification maintained on the system platform 12 and updated as hardware resources are added or removed, as well as on configuration characteristics tracked and generated by a hardware resource identifier 19. The hardware resource identifier 19 then uses this characteristic hardware resource information to generate an abstract resource description, otherwise known as an abstract resource diagram, (78 in FIG. 2) that identifies hardware resource constraints and interdependencies and that is used by the hardware resource manager 18 to designate certain of the resources 14 as allocated resources 15. Specific details as to the operation of the hardware resource identifier 19 are given in commonly assigned, co-pending application Ser. No. 09/592,320 entitled Hardware Resource Identifier For Software-Defined Communications Systems, the disclosure of which is incorporated herein by reference.

Figure 2:
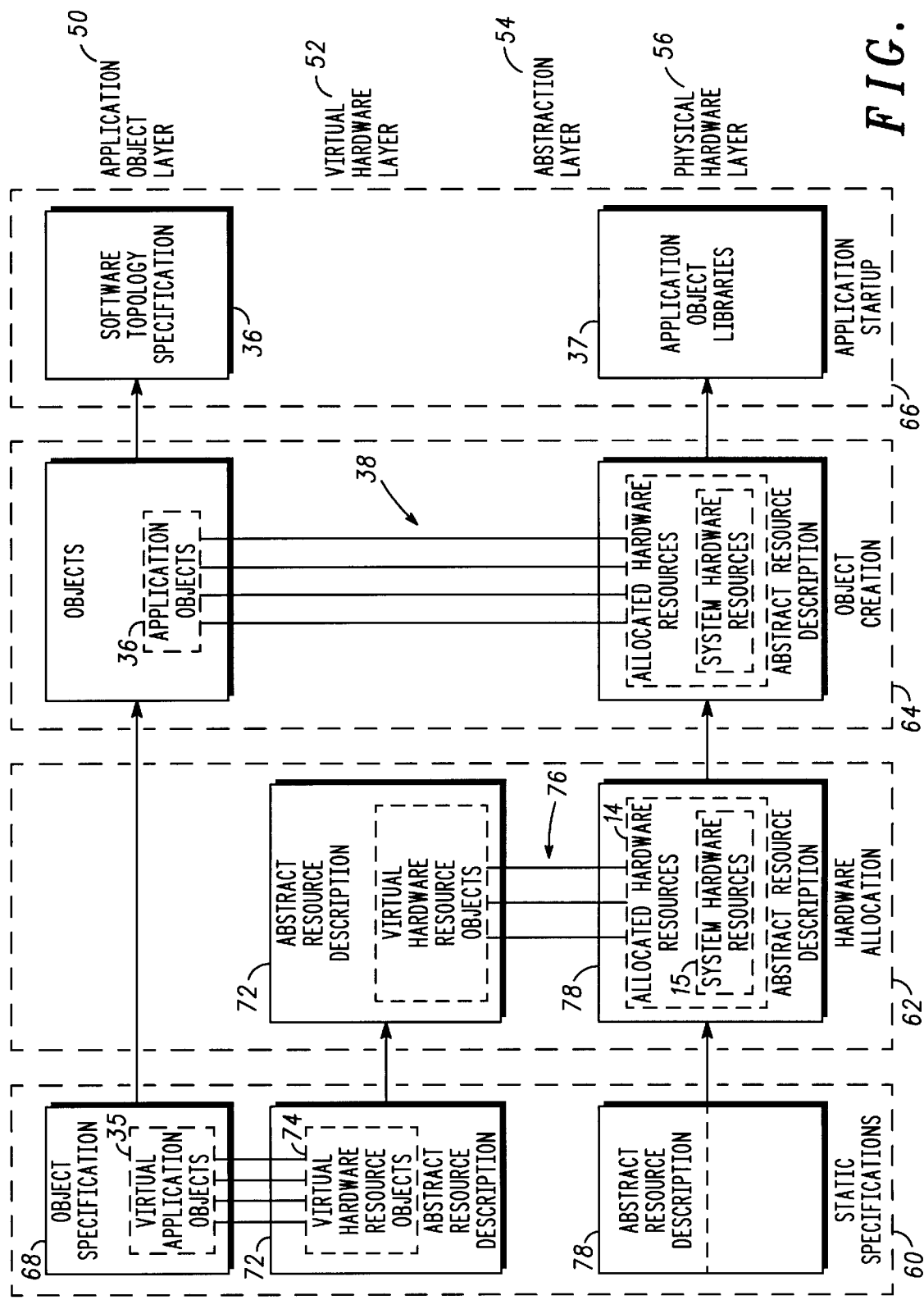
FIG. 2 is a block diagram showing the topology of and interaction among the hardware resource manager, the application manager and the hardware resource identifier shown in FIG. 1.

FIG. 2 is a more detailed block diagram of the topology of the system architecture of the multi-channel software-defined radio 10 shown in FIG. 1. As shown, the architecture includes several functional layers, including an application object layer 50, a virtual hardware layer 52, an abstraction layer 54 and a physical hardware layer 56, as well as several application management stages, including a static specification stage 60, a hardware allocation stage 62, an object creation stage 64 and an application startup stage 66. The functional layers 50–56 operate to load the application objects 36 onto the allocated hardware resources 15 based on the application specification 34, as well as the composite hardware specification provided by the hardware resource identifier 19 based on its processing of the static system hardware specification 40 provided with the system as well as its processing of the dynamic hardware discovery results.

The application object layer 50 includes the virtual application objects 35, which are in an object specification 68 and which identify software application objects 36 necessary to run a system application. The application manager 16 retrieves the identified application objects 36 from the application object libraries 37 based on the virtual objects 35 in the object specification 68 and loads the objects 36 onto the allocated hardware resources 15 as indicated at 38.

From information provided in the application specification 34, the application manager 16 also creates an abstract resource description 72 including virtual hardware resource objects 74 which identify application hardware requirements, and which are transmitted to the hardware resource manager 18 and mapped at 76 in the abstraction layer 54 to the available system hardware resources 14, based on the hardware resource interdependency data in the abstract resource description 78 generated by the hardware resource identifier 19, to create the allocated hardware resources 15 (the object specification 68, the abstract resource description 72 and all other specifications necessary to define an application are subsets of the application specification 34). The objects 36 are then loaded onto the allocated hardware resources 15 through the abstraction layer 54 at 38 to run the requesting application. The hardware resource identifier 19 applies hardware resource constraints and interdependencies as represented generally by the arrows 76 in the static specification stage 60 by interpreting the abstract hardware resource description 72 to enable the available hardware resources 14 to be effectively allocated by the hardware resource manager of the present invention.

Figure 3:
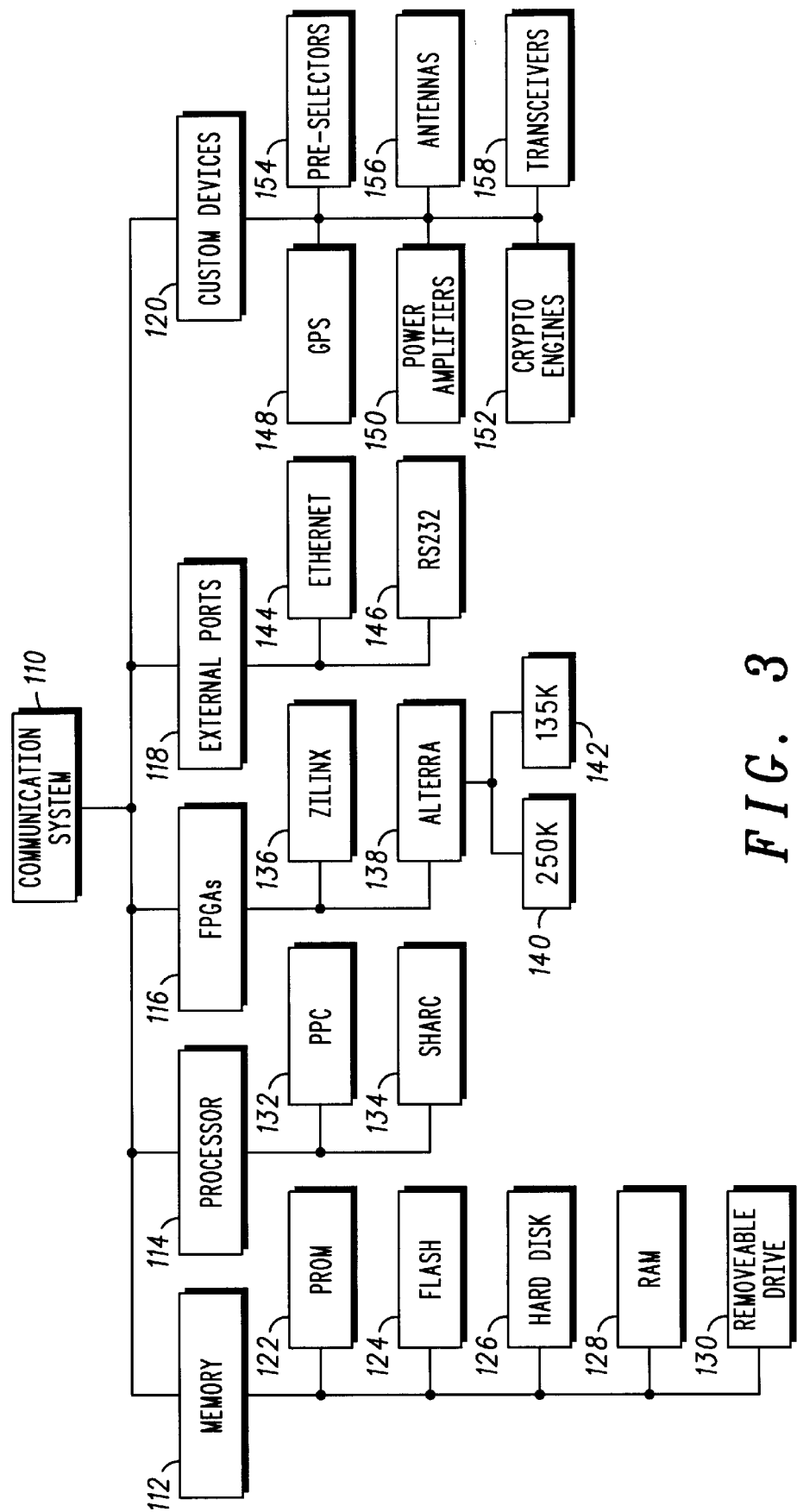
FIG. 3 is a partial resource tree of exemplary hardware resources in a software-defined communications system.

FIG. 3 shows hardware resources of an exemplary communications system, such as a multi-channel radio 110, in which the hardware resource manager according to a preferred embodiment of the present invention is implemented. The numerous hardware resources in the multi-channel radio 110 are categorized on a radio software operating system (not shown) according to resource function and specialization. The hardware resources generally include storage devices, such as memory 112, and dynamically reconfigurable processing elements such as processors 114, FPGAs 116, external ports 118 and custom devices 120.

More specifically, the memory 112 may include, for example, specialized resources such as a PROM 122, a flash memory 124, a hard disk 126, a RAM 128 and/or a removable drive 130 such as a zip drive, while the processors may include, for example, a Power PC (PPC) processor 132 and a Share DSP processor 134. The FPGAs 116 may include, for example, a Zilinx FPGA 136 and an Alterra FPGA 138, with the Alterra FPGA 138 including both a 250 k memory 140 and a 135 k memory 142. The external ports 118 may include, for example, an ethernet port 144 and an RS232 port 146, while the custom devices 120 may include, for example, a GPS tracking system 148, power amplifiers 150, cryptographic engines 152, pre-selectors 154, antennas 156 and signal transceivers 158. The hardware resource identifier 19 tracks each of the above resources so that the hardware resource manager of the present invention, which is a software application stored in the memory 112 and executed by the processors 114, can optimally match each system resource request with the hardware resource having the most appropriate resource capability.

Figure 4:
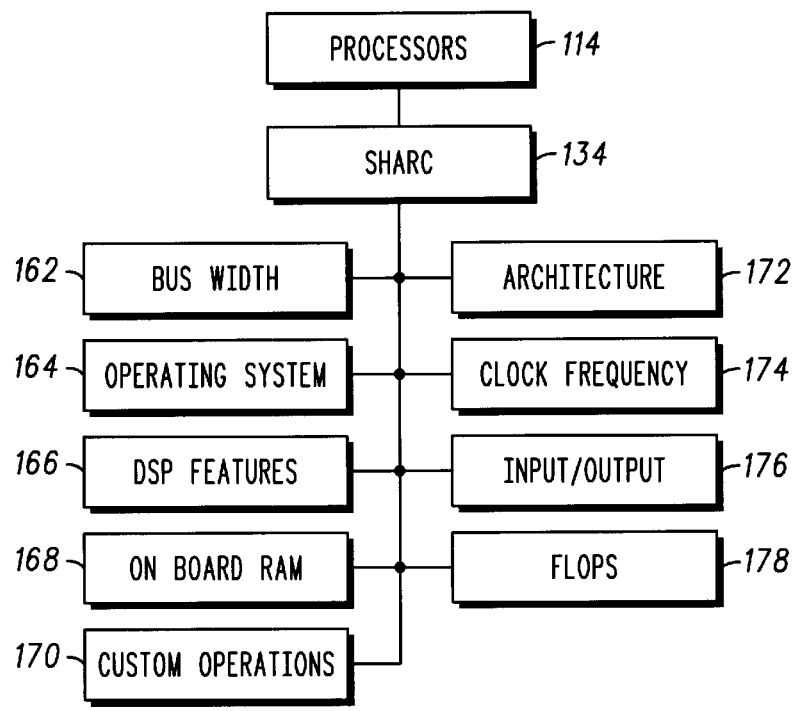
FIG. 4 is a block diagram of exemplary hardware resource capabilities of one of the hardware resources shown in FIG. 3.

Each of the above hardware resources 112–158 includes capabilities that, if properly defined in an abstract manner, can be utilized as a common capability language between end users, such as a specific system application requesting a resource or resources, and the system infrastructure. For example, referring to FIG. 4, the Sharc processor 134 includes capabilities such as a predefined bus width 162, an operating system or systems 164, DSP features 166, an onboard RAM 168 and predefined custom operations 170, as well as a defined hardware and software architecture 172, a clock frequency 174, a data input and output, indicated generally at 176, and FLOPS 178. For purposes of the following discussion of the present invention, the specific nature and grammar with respect to how the resource capabilities are characterized is not important as long as the grammar is present and can be utilized to characterize the available hardware resources and to specify the hardware resources required for each specific radio application.

Figure 5:
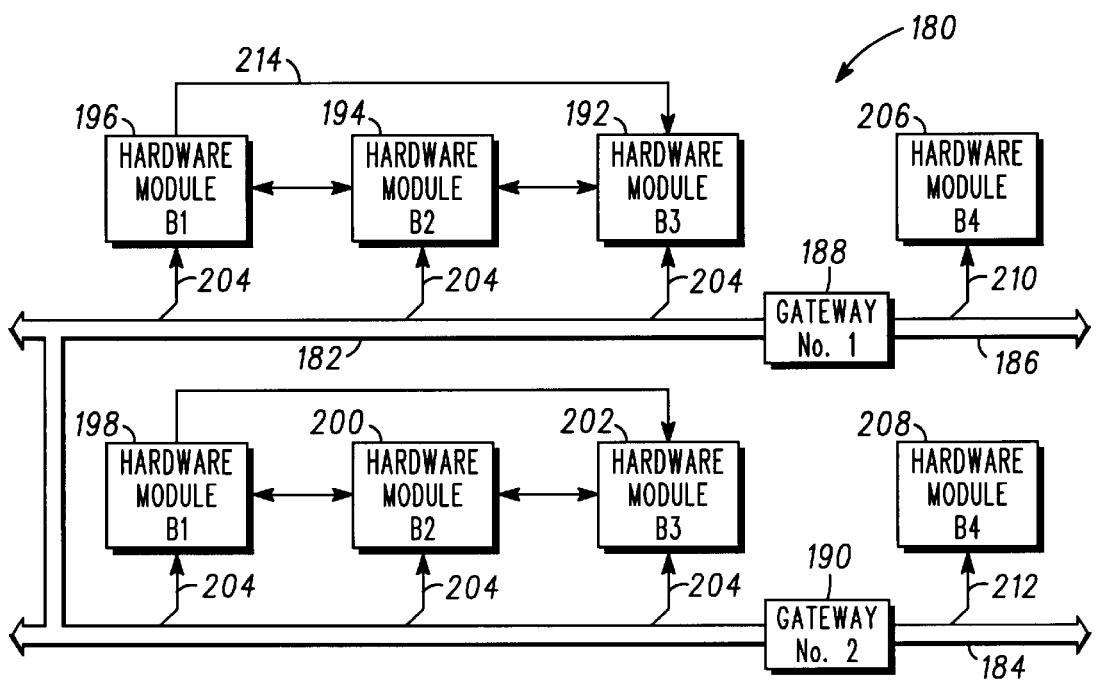
FIG. 5 is a block diagram of several interdependent hardware modules in a portion of an exemplary communications system.

FIG. 5 shows the hardware resources of an exemplary communications system of a software-defined multi-channel radio 180 of the type that has a system platform such as that shown in FIG. 1. The system 180 includes three buses 182, 184, 186, with buses 184, 186 each being connected to bus 182 through respective gateways, or bridges, 188, 190. The bus architectures may be conventional communications bus architectures such as VME, CPCI or VXE, for example, although the bus architectures may vary depending upon system performance needs. Hardware modules, such as printed wiring boards, 192, 194, 196, 198, 200, 202, each respectively include a collection of hardware resources within the same physical unit and are connected to the bus 182 via a physical interface 204, while hardware modules 206, 208 are physically connected to the respective buses 186, 184 via respective physical interfaces 210, 212. Alternatively, it would also be possible to view the module 196 as a standalone computing device connected to the communications bus 182 via an appropriate connection.

Each of the hardware modules 192–202 contains a predetermined set of specialized hardware resources, such as the resources 112–158 shown in FIG. 3 and as represented generally in FIG. 5 by B1, B2, B3, B4. Each set of specialized hardware resources on each respective hardware module may or may not be able to communicate directly with other specialized sets of hardware resources on other hardware modules depending upon the specific module locations relative to the bus gateways 188, 190. For example, the set of specialized hardware resources B4 located on the hardware module 206 may or may not be able to communicate directly with the specialized sets of hardware resources B3–B1 on hardware modules 192–196, while the specialized set of hardware resources located on the hardware module 208 may or may not be able to communicate directly with specialized set of hardware resources on hardware modules 198–202 due to respective system restrictions imposed through the gateways 188, 190. For example, if the network bus 186 represents a classified network containing sensitive information and the network bus 182 represents a publicly available network, then data communication from one network to the other will be restricted. Such a restriction is an important resource constraint that must be accounted for by the hardware resource manager 18 when allocating collections of resources to an application.

In addition, the multi-channel radio 180 may include built-in custom dependencies between certain of the hardware modules. For example, as shown in FIG. 5, the hardware module 196 is connected to the hardware module 192 through a special over-the-top custom connection, such as a hardwire connection, 214. Therefore, the special relationship between the hardware modules 192, 196 does not exist between, for example, the hardware modules 196, 202, even though the hardware modules 192, 202 include identical sets of specialized hardware resources B3.

As will be discussed later in more detail, the hardware resource manager of the present invention identifies such restrictions and over-the-top connections during its allocation of hardware resources, and therefore is capable of more precisely allocating all hardware resources compared to conventional hardware allocation systems.

Figure 6:
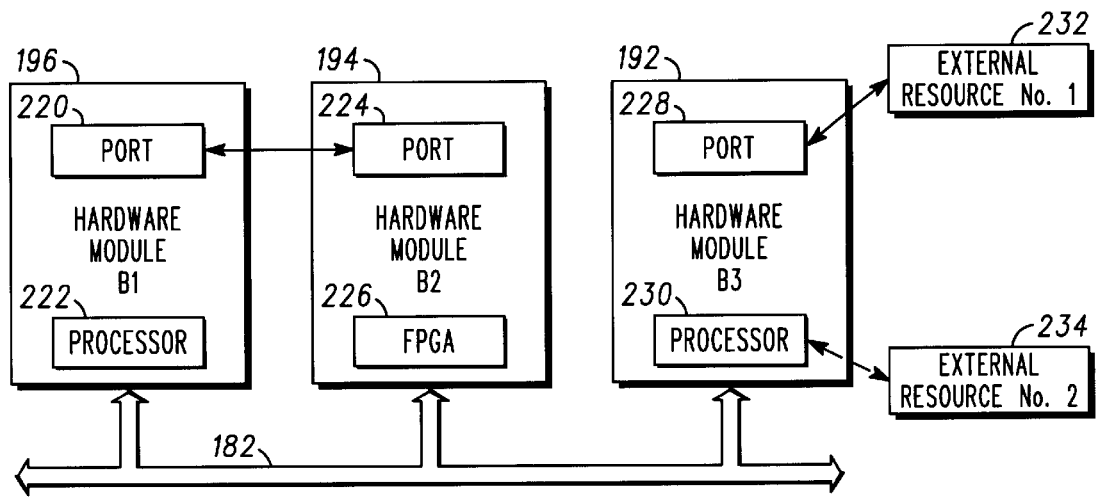
FIG. 6 is a block diagram of exemplary managed and unmanaged hardware modules in a portion of an exemplary communications system.

Referring now to FIG. 6, not all hardware resources in the multi-channel radio 180 are resources that must be discovered, tracked and specifically allocated to particular communications system applications by the hardware resource manager of the present invention, such as a port 220 and a processor 222 in the hardware module 196, a port 224 and an FPGA 226 in the hardware module 194, and a port 228 and a processor 230 in the hardware module 192. Other hardware resources that are not direct resources of the communications system 110, such as a data terminal (not shown) connected to a communications device external port (not shown), may or may not be directly managed by the hardware resource manager of the present invention depending on the ability of the hardware resource manager to either directly or indirectly control the resource. For example, an external resource 232 is associated with the port 228 and is managed by the hardware resource manager of the present invention, while the external resource 234 is associated with the processor 230 but is not managed by the hardware resource manager because the port by which the external resource 234 is connected to the processor 230 is hidden from the hardware resource manager. In other words, a resource is hidden from the resource manager when the resource was never declared in the hardware resource specification for the system, and was never dynamically discovered through network queries. Therefore, an executing system application must determine how to directly access the resource 234 once the resource manager has allocated (mapped) the processor 230 to the application.

Figure 7:
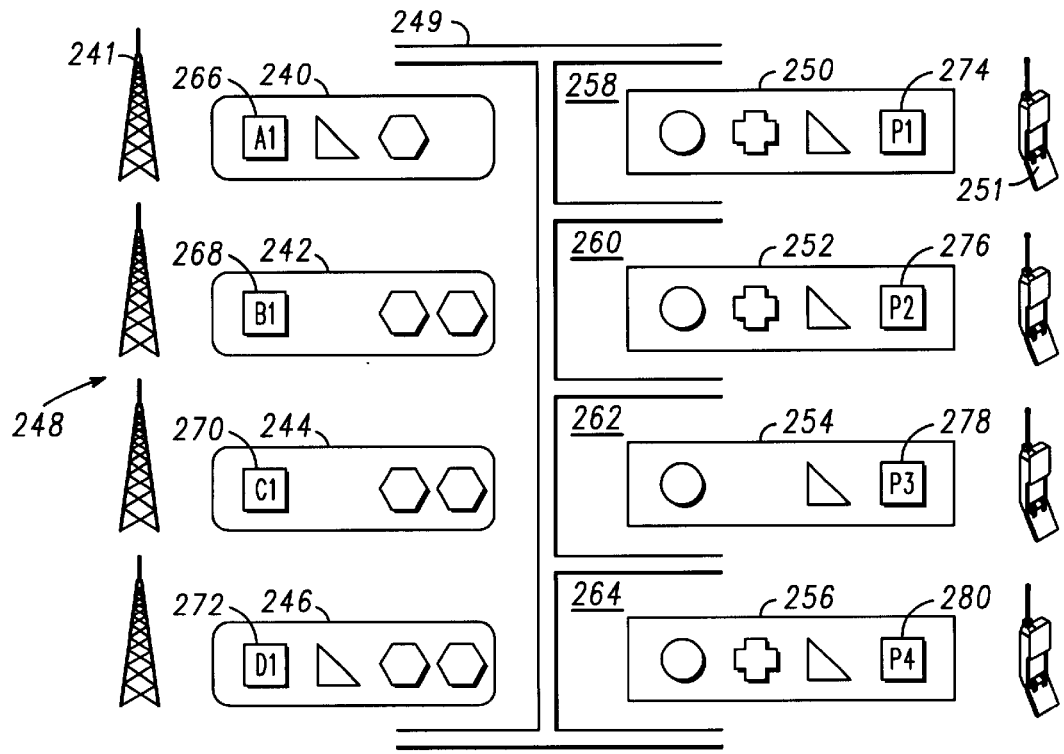
FIG. 7 is a symbolic block diagram of exemplary communications system hardware resource modules and corresponding resources separated into discrete resource domains.

Referring now to FIG. 7, dynamic allocation of hardware resources by the hardware resource manager of the present invention to system applications will now be described. Different geometric shapes represent different types of specialized hardware resources. For example, the geometric shapes within a hardware resource group 240 may represent an RF modem resource group for establishing a communications link with a system antenna 241, while the geometric shapes within a hardware resource group 250 may represent a baseband processor resource group for processing signals that are output to an audio handset receiver 251. However, for purposes of discussion, the geometric shapes need not represent any particular specialized hardware resources. In addition, while the operation of the hardware resource manager will be described in terms of resource groups such as the resource groups 240, 250, the hardware resource manager of the present invention may also be effectively utilized in systems requiring allocation of individual resources rather than or in addition to resource groups.

Still referring to the exemplary layout of resource groups in FIG. 7, resource groups 240, 242, 244, 246 are all the same type of resource group and are located within a single common domain 248. By being located within the common domain 248, each of the resource groups 240–246 can directly address other resource groups within the domain using a communications bus 249. In other words, instantiated application objects share a common name server for resolving other application object addresses within the domain. The name server is a reference to a CORBA method for locating objects in an object-based distributed computing system. The domain is a common name space. Therefore, common objects must be uniquely addressable within the domain. For example, an object in the domain 248 would not be capable of locating an object in the domains 258–264. Hardware located in different domains, such as hardware resource groups 250, 252, 254, 256, while being the same type of resource group such as, for example, a baseband processing group, are located in different domains 258, 260, 262, 264, respectively, and therefore require special processing, such as proxy connection or security firewall processing, to communicate among one another, or with the resource groups in the common domain 248. The partitioning of resources into groups and domains provides a means of describing the connectivity/isolation of the resources.

Hardware resources 266, 268, 270, 272 in resource groups 240–246 are respectively labeled with absolute resource IDs A1, B1, C1, D1, while hardware resources 274, 276, 278, 280 in resource groups 250–256 are respectively labeled with absolute resource IDs P1, P2, P3, P4. For purposes of discussion, the absolute resource IDs for hardware resources 266–272 and 274–280 are shown. However, all hardware resources in a system have such IDs, as the IDs enable the resources to be unambiguously identified across the system if a particular application absolutely requires a specific hardware resource. As will be described below in more detail, such absolute hardware resource requirements impose an anchor resource limitation on the resource groups.

Figure 8:
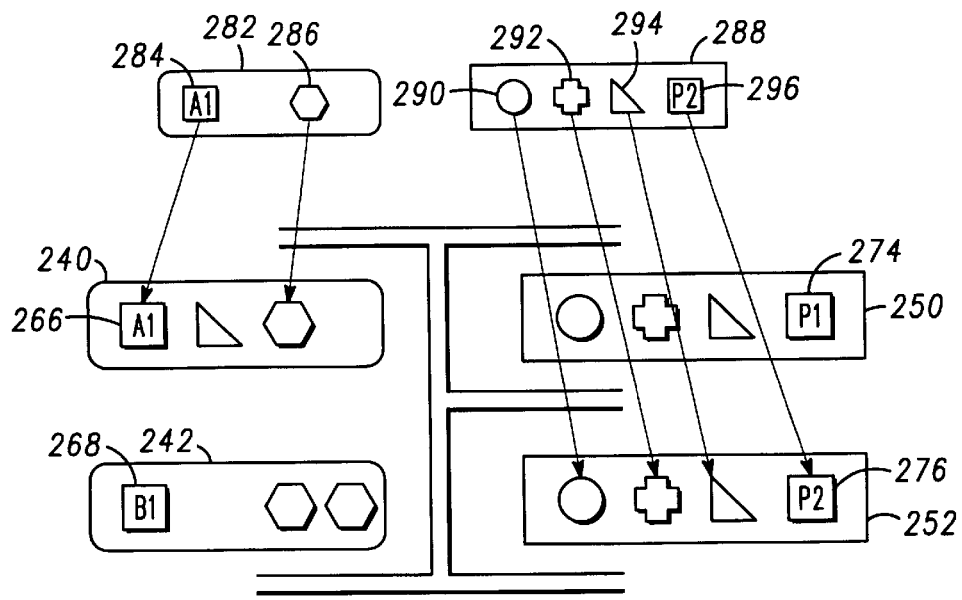
FIG. 8 is a symbolic block diagram of a communications system hardware resource specification showing the mapping of a resource specification to available hardware resources.
Figure 10:
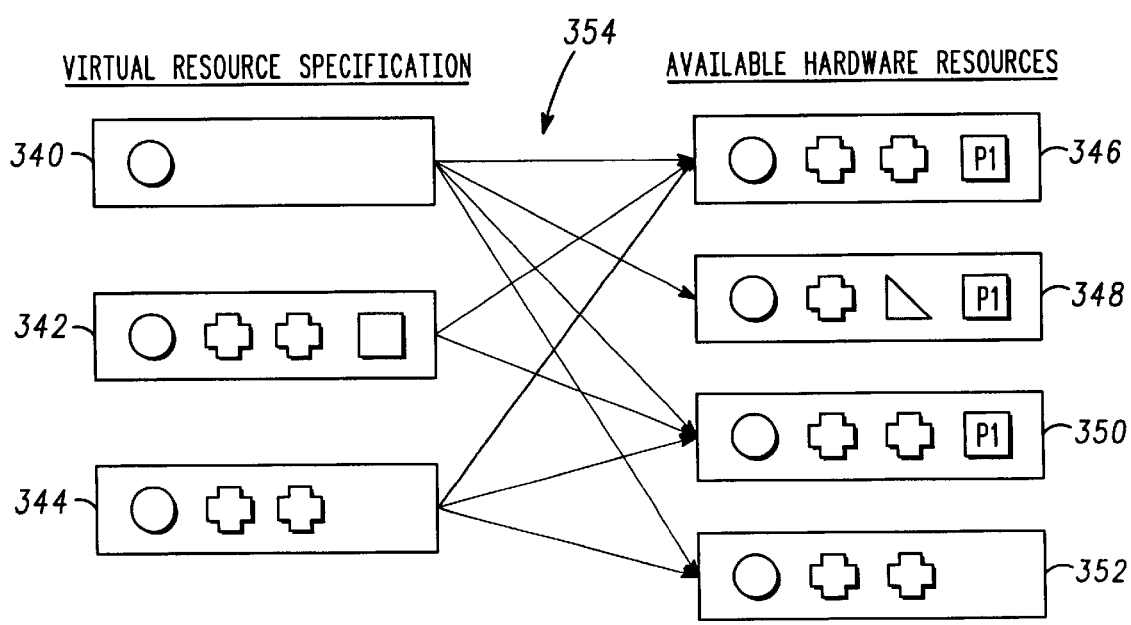
FIGS. 10–13 are symbolic block diagrams illustrating implementation of the methodology of FIG. 9 to map the virtual resource specification to available hardware resources.

Referring now to FIG. 8, an example of how a specification of hardware resources necessary for execution of a system application are mapped to available hardware resources from the hardware resource groups of FIG. 7 by the hardware resource manager of the present invention will be discussed. For purposes of discussion, the hardware resource groups 240, 242 in the domain 248 and the hardware resource groups 250, 252 in respective domains 258, 260 are assumed to be the available resources. However, actual available resources may vary according to the number and types of applications being run on the system platform.

In FIG. 8, an exemplary hardware resource specification defines a collection of both absolute hardware resources as well as virtual hardware resources that have yet to be mapped to existing resources but that, if successfully mapped into available hardware resources, can support the needs of an application requesting the resources. The specification is defined by a first virtual hardware resource group (VRG) 282 including virtual hardware resources 284, 286 and a second virtual hardware resource group 288 including virtual hardware resources 290, 292, 294, 296. Virtual hardware resources 286, 290, 292, 294 having dashed borders are constrained by general characteristics and have not yet been mapped to a specialized hardware resource, while virtual resources 284, 296 with solid borders each are constrained by respective absolute resource references A1, P2 to a physical hardware resource. For example, the virtual resource 284 might be constrained to one particular external port that must be allocated to a requesting application for the application to execute. Therefore, an absolute resource reference such as the reference A1 in the resource specification creates anchor resource limitations in the first virtual hardware resource group 282, as it anchors the virtual resource 284 and its associated resource group 282 to actual physical resources. The hardware resource manager of the present invention optimizes the selection of virtual hardware resources within the limitations of any such absolute resource reference constraints.

In addition, the rounded corner virtual hardware resource group 282 must be mapped into one of the two available rounded corner hardware resource groups 240, 242. Also, the virtual hardware resource group 288 must be mapped into either of the available hardware resource groups (ARGs) 250, 252. However, the absolute resource references A1, P2 make the mapping of the virtual resources 284, 296 and the respective resource groups 282, 288 to available specialized hardware resources in the respective resource groups 240, 252 unambiguous as previously discussed.

Figure 9:
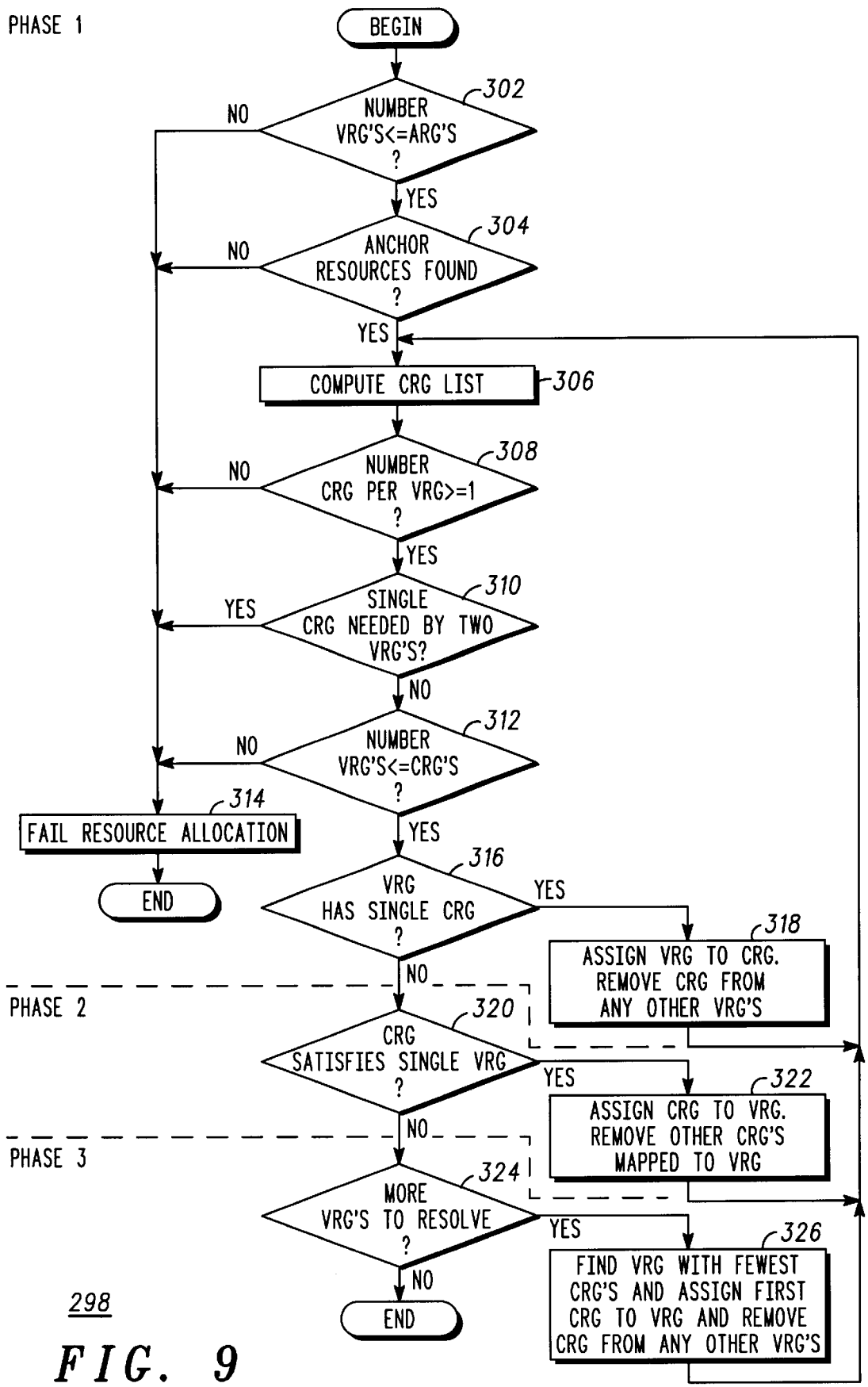
FIG. 9 is a flow diagram of the methodology of the present invention for allocating available hardware resources in response to a virtual hardware specification.

The methodology of the hardware resource manager of the present invention is shown generally at 298 in FIG. 9. Although the methodology will be discussed based on the assumption that the hardware resource manager allocates hardware resource groups, the hardware resource manager also is capable of allocating individual specialized hardware resources within a resource group, or individual resources outside of a resource group, in a similar manner.

At 300, a called communications system application requests a hardware resource specification. Subsequently, Phase 1 of the methodology is implemented to execute a non-negotiable hardware resource mapping mode during which several checks are executed to ensure that valid starting conditions exist. Specifically, at 302, it is verified that the number of VRGs specified by the application is less than or equal to the total number of ARGs to ensure that all VRGs are resolvable. At 304, it is verified that all absolute resources requested by the resource specification are available. If all absolute resources are available, at 306 a list of candidate hardware resource groups (CRGS) is created for each requested VRG. The hardware resource manager creates this list by classifying each ARG as a CRG to be listed if the ARG contains all specialized hardware resources required by the VRG. At 308, it is determined whether each VRG has at least one CRG, while at 310 it is confirmed that no single CRG is the only candidate for two or more VRGs. Additionally, at 312 it is verified that the total number of VRGs is less than or equal to the total number of CRGs to ensure that all VRGs are capable of being mapped.

If any of the above checks at 302–312 concludes in an unsatisfactory result, the methodology defaults to 314 to execute in failed resource allocation mode. In such a case, resource allocation will be unsuccessful, as at least one requested resource cannot be allocated. Therefore, the application must decide whether to proceed with degraded service or whether to fail altogether.

If the above checks are satisfactory, the methodology advances to map all VRGs to CRGs in an optimal manner by iteratively applying several rules to all VRGs to determine how the VRGs should be mapped into CRGs. Specifically, at 316 a non-negotiable allocation mode is implemented, during which it is determined whether each VRG has a single CRG. If any VRG indeed has only one CRG, then at 318 the VRG is mapped directly to the CRG, the CRG is disqualified from being a CRG for any other VRG, and the CRG list is updated accordingly at 306.

At 320, Phase 2 of the methodology is initiated to execute an independent negotiable optimized mapping mode if predetermined conditions exist. Specifically, it is determined whether any CRG satisfies only a single VRG. If it is determined that a CRG satisfies only a single VRG, at 322 the CRG is mapped to the corresponding VRG, as such an assignment will not adversely affect the mapping of any other VRGs, and the methodology returns to 306 to update the CRG list.

Subsequent to the mapping modes of Phases 1 and 2, at 224 Phase 3 of the methodology is initiated to execute an interdependent negotiable optimized mapping mode. During Phase 3, it is determined if any VRGs remain to be resolved. If VRGs do remain to be resolved, at 326 the VRG with the fewest CRGs is mapped to its first CRG. Consequently, the most difficult mappings are resolved first. When for example two VRGs are determined at 324 to have the same number of CRGs, the VRG to which the Phase 3 mode is first applied is resolved first.

To further improve the allocation proficiency, cost functions can be applied to all of the possible choices at decision points 320 and 326 to decide upon one of many possible choices. For example, at decision point 320 three CRGs may be found which each satisfy a single VRG. While each one of the three VRGs represent a successful mapping choice, it is highly desirable to preserve the two most capable CRGs and to assign the least capable, but still qualified, CRG to the VRG. By utilizing a cost function that measures the capability of the CRG, the CRG with the lowest cost function therefore is chosen. Likewise, at 326, more than one VRG with the minimum number of CRGs may exist. In other words, a two or three-way tie may exist for the VRG with the minimum number of CRGs. Typically, a tie can be broken using an appropriate cost function designed to preserve most capable/least available resources.

As discussed above, the methodology continues to update the CRG list upon execution of any of the mapping modes of Phases 1–3 if all VRGs have not been mapped to a CRG, and then proceeds again through 308–326 until all VRGs have been mapped to a CRG. If at any time during the execution of the Phase 1–3 mapping modes the resource allocation process fails, the methodology defaults to the failed hardware resource allocation mode at 314.

FIGS. 10–13 illustrate an exemplary step-by-step dynamic mapping of three virtual resource specification VRGs 340, 342, 344 into a set of four ARGs 346, 348, 350, 352 according to the hardware resource manager of the present invention as discussed above in conjunction with FIG. 9. Subsequent to determining at 302 that the number of VRGs is less than the number of ARGs and at 304 that the no anchor resources are present, at 306 the hardware resource manager compiles a CRG list for each VRG, represented generally in FIG. 10 by the mapping arrows at 354. The hardware resource manager then checks the CRG list and at 308 determines that each VRG has at least one CRG. Specifically, the VRG 340 has four CRGs (346–352), the VRG 342 has two CRGs (346, 350), and the VRG 344 has three CRGs (346, 350, 352). At 310 the hardware resource manager verifies that no CRG is mandated by two or more VRGs, and at 312 determines that the number of VRGs is less than the number of unique CRGs.

Figure 11:
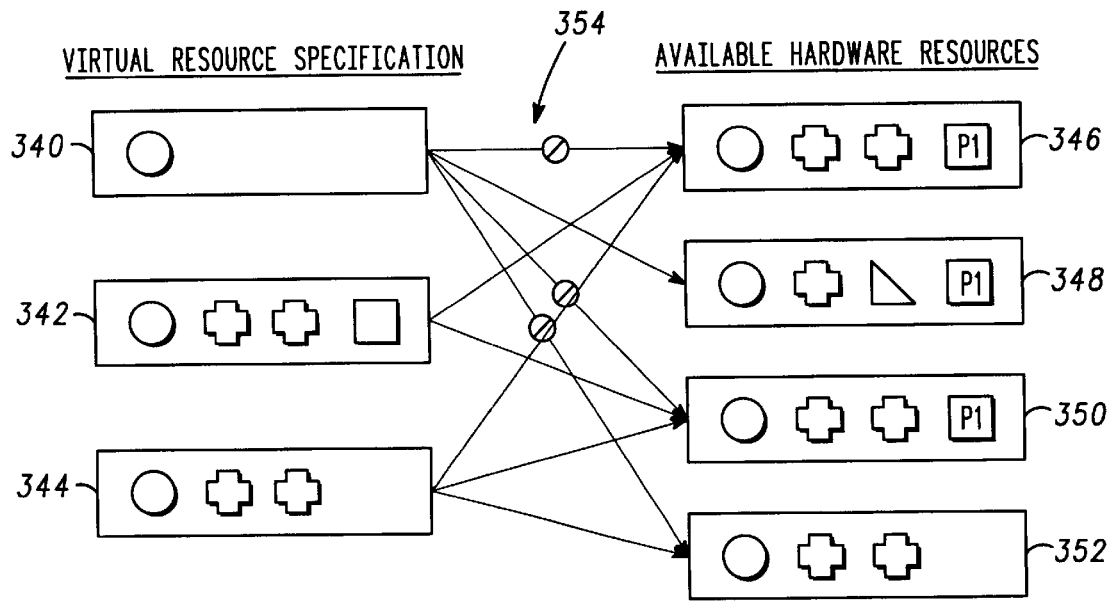

Upon completing the above checks, the hardware resource manager 18 attempts to initiate the mapping modes of Phases 1–3 at 316–326. Specifically, all VRGs having a single CRG are initially resolved. In the example shown in FIG. 11, as the virtual resource specification does not include any VRGs having just a single CRG, the methodology proceeds to the Phase 2 mapping mode at 320 and resolves all VRGs with a CRG that modifies only that particular VRG. In FIG. 11, as the CRG 348 is a candidate only for the VRG 340, at 322 the VRG 340 is mapped to the CRG 348 as indicated by the bolded mapping arrow 360, and the CRG list is updated at 306 to remove all other CRGs that initially were candidates of the VRG 340, as indicated by the universal NOT symbols in FIG. 11, with the corresponding CRGs remaining unallocated. In the present example, it is assumed that the available hardware resource groups are exclusively allocated to the presently discussed application; however, it may be possible, depending upon the type of resource group, for the unallocated resources within resource groups 346–352 to be accessible for use by other applications.

Figure 12:
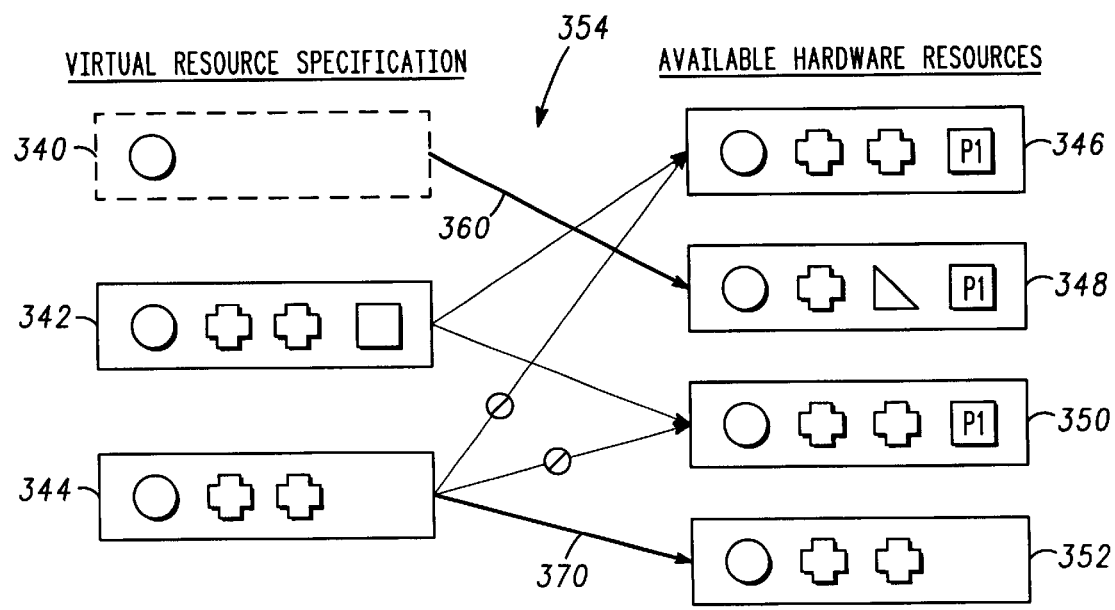
Figure 13:
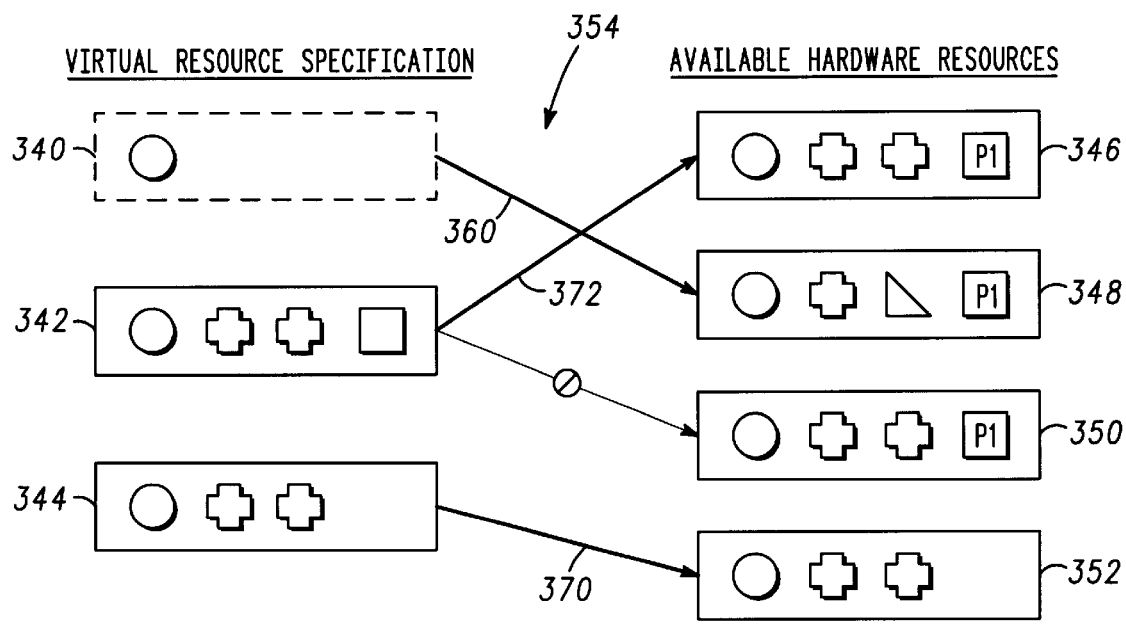

Turning now to FIG. 12, the hardware resource manager at 320 next resolves all VRGs that have only a single CRG. However, as both the VRG 342 and the VRG 344 have multiple CRGs, the methodology proceeds to 320 to resolve all VRGs having a uniquely dedicated CRG. As the CRG 352 is uniquely dedicated to the VRG 344, at 322 the VRG 344 is mapped to the CRG 352 as indicated by the bold mapping arrow 370, and the CRG list is updated at 306 to remove all other CRGs that initially were candidates of the VRG 344, as indicated by the universal NOT symbols in FIG. 12, with the corresponding CRGs 346, 350 remaining unallocated. After updating the CRG list at 306, the methodology then resolves the remaining VRG 342.

Specifically, after the CRG list is updated at 306 for the VRG 342 and the checks are performed at 308–312 in the previously discussed manner, at 316 the hardware resource manager resolves all VRGs having a single CRG. As the VRG 342 has both remaining CRGs 346, 350, the methodology proceeds to 320 and resolves all VRGs with a uniquely dedicated CRG. As both of the remaining CRGs 346, 350 are uniquely dedicated to the VRG 342, the hardware resource manager maps the first-encountered CRG 346 to the VRG 342 as indicated by the bold mapping line 372 in FIG. 13. Alternatively, a cost function may be used to optimize the choice between the CRGs 346, 350.

Therefore, the hardware resource manager of the present invention successfully maps all three VRGs to ARGs in a manner ensuring that the most capable resource group possible remains available as an unused resource as long as possible for subsequent allocation demands.

As should now be appreciated from the foregoing discussion, the hardware resource manager of the present invention is capable of dynamically mapping hardware resources in a multi-channel communications system in a manner that frees the system platform infrastructure, system applications and the system operator from having to directly specify target hardware resources for use with a particular application. Specifically, the present invention is capable of determining how to allocate hardware resources based on the best fit of a hardware resource specification, which defines the mandatory and desirable characteristics of all required hardware resources without naming specific hardware instances, to the available hardware resources.

Therefore, the hardware resource manager reduces the likelihood of wasted resources due to overqualified hardware being inappropriately allocated to simple applications, thereby leaving more complex resources without sufficient resources. Also, the hardware resource manager prevents rare resources from unnecessarily being allocated to applications when more common alternatives that meet the hardware resource requirements of the application are available.

As a result of its above-mentioned capabilities, the hardware resource manager of the present invention has particular application in hardware environments such as, for example, personal computers and parallel computing systems. Regarding personal computers, the hardware resource manager dynamically maps a printed output to one of numerous physically networked printer resources rather than the printer resource being statically configured by the operator or by the application software. Therefore, the best type of available printer for a particular application can be automatically recognized and selected. For example, the present invention can automatically route large diagrams to the nearest available plotter.

Figure 14:
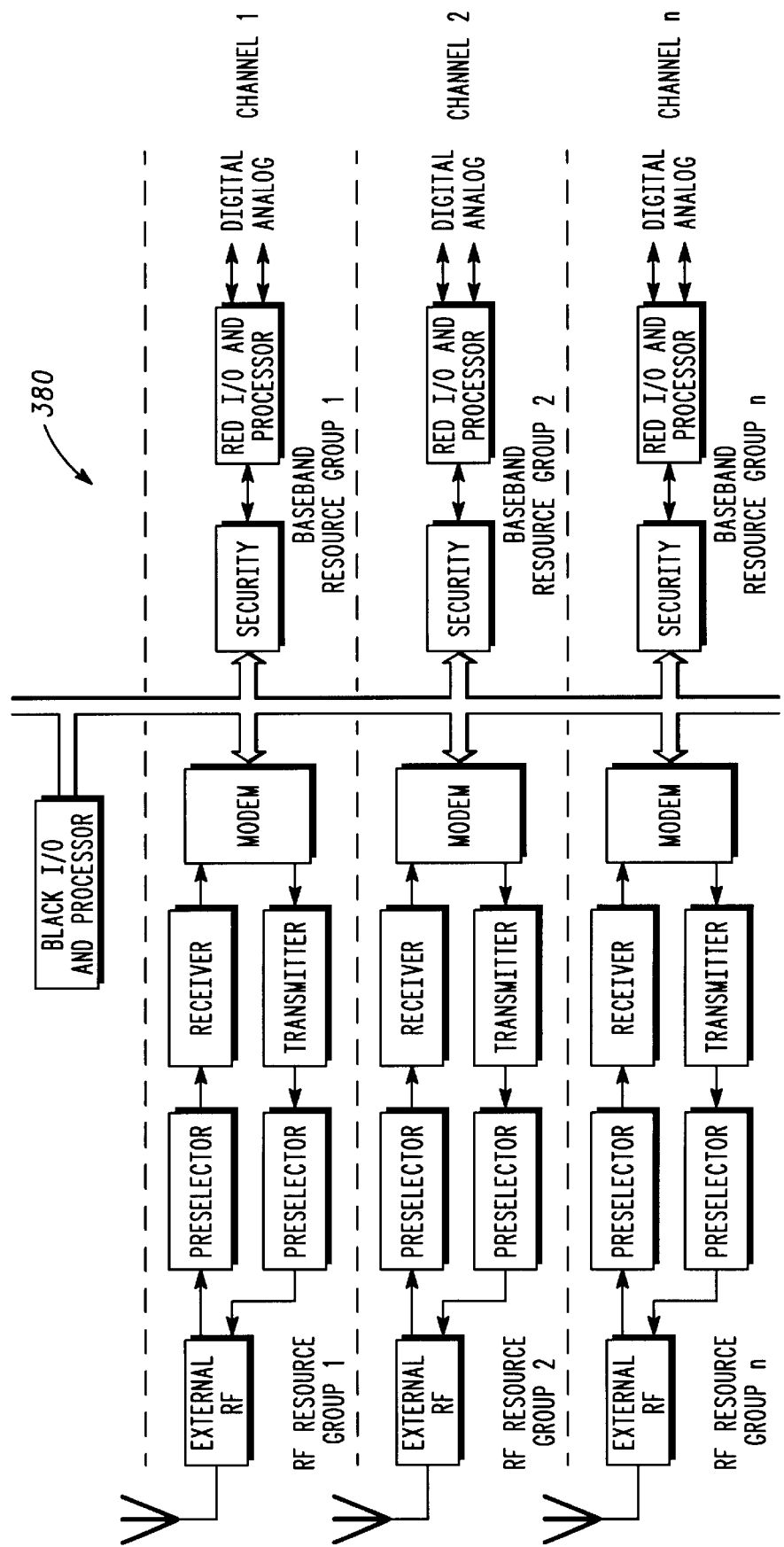
FIG. 14 is an exemplary parallel communications system in which the hardware resource manager of the present invention can be implemented.

Regarding parallel computing systems, systems such as the multi-channel software-defined radio shown at 380 in FIG. 14 include duplicate hardware resources that enable system applications to achieve higher throughput. The hardware resource manager of the present invention enables the speed of applications in such systems to be maximized by enabling the hardware resources to be allocated in ways that support and respect the real time demands of the software/hardware combinations.

In addition, the hardware resource manager of the present invention has numerous other applications, including, for example, applications with respect to: internet accessible hardware intensive test platforms for third party software developers and systems integrators; environments with multiple multi-channel software-defined radios running concurrent disparate communication waveforms with multi-waveform topologies, such as voice bridging and simul-transceiving super circuits; large scale communications networks involving numerous legacy communications and processing hardware resources; and parallel computing systems through a collection of networked resources.

Finally, while the hardware resource manager of the present invention has been described as being independent from the platform on which it is implemented, and therefore portable, it should be appreciated that the hardware resource manager of the present invention may also be designed to enforce platform-specific allocations based on predetermined platform manager parameters.

While the above description is of the preferred embodiment of the present invention, it should be appreciated that the invention may be modified, altered, or varied without deviating from the scope and fair meaning of the following claims.

What is claimed is:

1. A method for managing hardware resources of a multi-channel software-defined communications system, comprising:

tracking available system hardware resources;

creating a specification of required hardware resources necessary for executing a system application;

creating a list of candidate hardware resources in response to the tracking of available system hardware resources and the creating of a specification of required hardware resources; and mapping each required hardware resource on the specification of required hardware resources to a least functional and most available candidate hardware resource on the list of candidate hardware resources in a manner that maximally preserves most functional and least available candidate hardware resources on the list of candidate hardware resources.

2. The method of claim 1, wherein the mapping of each required hardware resource on the specification of required hardware resources comprises:

performing a non-negotiable hardware resource mapping of a required hardware resource from the specification of required hardware resources to a candidate hardware resource on the list of candidate hardware resources if the required hardware resource from the specification of the required hardware resources can only be mapped to the candidate hardware resource on the list of candidate hardware resources;

performing an independent negotiable optimized mapping of the candidate hardware resource on the list of candidate hardware resources to the required hardware resource from the specification of required hardware resources if the candidate hardware resource on the list of the candidate hardware resources satisfies only the required hardware resource from the specification of required hardware resources; and performing an interdependent negotiable optimized mapping of a first found candidate hardware resource on the list of candidate hardware resources to the required hardware resource from the specification of required hardware resources if the required hardware resource remains to be mapped after the performing of a non-negotiable hardware resource mapping and the performing of an independent negotiable optimized mapping.

3. The method of claim 2, further comprising removing the candidate hardware resource from the list of candidate hardware resources after the performing of a non-negotiable hardware resource mapping; and updating the list of candidate hardware resources.

4. The method of claim 2, further comprising removing the candidate hardware resource from the list of candidate hardware resources after the performing of an independent negotiable optimized mapping; and updating the list of candidate hardware resources.

5. The method of claim 2, further comprising removing the candidate hardware resource from the list of candidate hardware resources after the performing of an interdependent negotiable optimized mapping; and updating the list of candidate hardware resources.

6. The method of claim 1, further comprising defaulting to a failed resource allocation mode if a total number of required hardware resources on the specification of required hardware resources is greater than a total number of available hardware resources, or if no anchor resources are found.

7. The method of claim 1, further comprising defaulting to a failed resource allocation mode if a ratio of a total number of candidate hardware resources to a total number of required hardware resources is greater than or equal to 1, if two or more required hardware resources need a single candidate hardware resource, or if a total number of required hardware resources is less than or equal to a total number of candidate hardware resources.

8. The method of claim 1, wherein the creating of a list of candidate hardware resources further comprises factoring in anchor resource limitations into the list of candidate hardware resources.

9. The method of claim 1, wherein the creating of a list of candidate hardware resources further comprises factoring in platform specific hardware resource mapping limitations into the list of candidate hardware resources.

10. The method of claim 1, wherein the mapping of each required hardware resource on the specification of required hardware resources comprises:

performing a non-negotiable hardware resource mapping of a required hardware resource from the specification of required hardware resources to a candidate hardware resource on the list of candidate hardware resources if the required hardware resource from the specification of the required hardware resources can only be mapped to the candidate hardware resource on the list of candidate hardware resources;

performing an independent negotiable optimized mapping of the candidate hardware resource on the list of candidate hardware resources to the required hardware resource from the specification of required hardware resources if the candidate hardware resource on the list of the candidate hardware resources satisfies only the required hardware resource from the specification of required hardware resources; and using cost functions to optimize otherwise equal choices if the required hardware resource remains to be mapped after the performing of a non-negotiable hardware resource mapping and the performing of an independent negotiable optimized mapping.

11. A method for allocating hardware resources in a software-defined communications system, comprising:

computing a virtual hardware resource group list of hardware resources necessary to execute an application;

computing a candidate hardware resource group list from available hardware resource groups in response to the computing of a virtual hardware resource group list;

assigning a virtual hardware resource group to a candidate hardware resource group if the virtual hardware resource group list has only one candidate hardware resource group;

assigning a candidate hardware resource group to a virtual hardware resource group if the candidate hardware resource group list satisfies only a single virtual hardware resource group;

locating a virtual hardware resource group with a least number of candidate hardware resource groups; and assigning a first candidate hardware resource group to the virtual hardware resource group in response to the locating of a virtual hardware resource group with a least number of candidate hardware resource groups.

12. The method of claim 11, further comprising:

removing the candidate hardware resource group from the candidate hardware resource group list after the assigning of a candidate hardware resource group to a virtual hardware resource group; and updating the candidate hardware resource group list after the removing of the candidate hardware resource group from the candidate hardware resource group list.

13. The method of claim 11, further comprising:

removing the candidate hardware resource group from the candidate hardware resource group list after the locating of a virtual hardware resource group with a least number of candidate hardware resource groups and the assigning of a first candidate hardware resource group to the virtual hardware resource group; and updating the candidate hardware resource group list after the removing of the candidate hardware resource group from the candidate hardware resource group list.

14. The method of claim 11, further comprising repeating the computing of a candidate hardware resource group list from available hardware resource groups, the assigning of a virtual hardware resource group to a candidate hardware resource group if the virtual hardware resource group has only one candidate hardware resource group, the assigning of a candidate hardware resource group to a virtual hardware resource group if the candidate hardware resource group list satisfies only a single virtual hardware resource group, the locating of a virtual hardware resource group with a least number of candidate hardware resource groups, and the assigning of a first candidate hardware resource group to the virtual hardware resource group until all of the virtual hardware resource groups are mapped.

15. The method of claim 11, further comprising defaulting to a failed resource allocation mode if after the computing of a candidate hardware resource group list it is determined that a ratio of a number of candidate hardware resource groups to a number of virtual hardware resource groups is greater than or equal to one, two virtual hardware resource groups simultaneously require a single candidate hardware resource group, or a total number of virtual hardware resource groups is less than or equal to a total number of candidate hardware resource groups.

16. The method of claim 11, further comprising defaulting to a failed resource allocation mode if after the computing of a virtual hardware resource group list necessary to execute an application it is determined that a number of virtual hardware resource groups on the virtual hardware resource group list is less than or equal to a number of available hardware resource groups, or that no anchor resources have been found.

17. The method of claim 11, wherein the assigning of a first candidate hardware resource group to the virtual hardware resource group is realized through use of a cost function.

18. A software-defined communications system, comprising:

a plurality of defined hardware resources for use, either singly or in a specified combination, in carrying out a system application;

a hardware resource manager for creating a specification of required hardware resources necessary for carrying out the system application;

the hardware resource manager also for creating a list of candidate hardware resources from the plurality of defined hardware resources after creating the specification of required hardware resources; and the hardware resource manager further for mapping each required hardware resource in the specification of required hardware resources to a least functional and most available candidate hardware resource on the list of candidate hardware resources in a manner that maximally preserves most functional and least available candidate hardware resources on the list of candidate hardware resources.

19. The software-defined communications system of claim 18, wherein the hardware resource manager is further for distinguishing between independent hardware resources and hardware resources including custom dependencies in creating a list of candidate hardware resource groups.

20. The software-defined communications system of claim 19, wherein the custom dependencies include an anchor resource limitation.

* * * * *